(12) United States Patent
Mudawar

(10) Patent No.: US 12,277,404 B2
(45) Date of Patent: Apr. 15, 2025

(54) EXACT VERSUS INEXACT DECIMAL FLOATING-POINT NUMBERS AND COMPUTATION SYSTEM

(71) Applicant: King Fahd University of Petroleum and Minerals, Dhahran (SA)

(72) Inventor: Muhamed F. Mudawar, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 752 days.

(21) Appl. No.: 17/523,383

(22) Filed: Nov. 10, 2021

(65) Prior Publication Data
US 2023/0147929 A1    May 11, 2023

(51) Int. Cl.
*G06F 7/499* (2006.01)
*G06F 7/487* (2006.01)

(52) U.S. Cl.
CPC ........ *G06F 7/49915* (2013.01); *G06F 7/4873* (2013.01); *G06F 7/49936* (2013.01); *G06F 7/49957* (2013.01)

(58) Field of Classification Search
CPC ............... G06F 7/49915; G06F 7/4873; G06F 7/49936; G06F 7/49957
See application file for complete search history.

(56) References Cited

U.S. PATENT DOCUMENTS

| | | | |
|---|---|---|---|
| 8,694,572 B2 | 4/2014 | Samy et al. | |
| 2002/0198918 A1* | 12/2002 | Steele, Jr. | G06F 7/49947 708/497 |
| 2006/0047739 A1 | 3/2006 | Schulte et al. | |
| 2010/0312812 A1* | 12/2010 | Wang | G06F 17/10 708/209 |
| 2012/0011185 A1* | 1/2012 | Mohamed | G06F 7/4917 708/497 |
| 2014/0101215 A1* | 4/2014 | Ayoub | H03M 7/12 708/204 |
| 2015/0254065 A1* | 9/2015 | Brooks | G06F 5/00 708/204 |
| 2016/0098248 A1* | 4/2016 | Carlough | G06F 7/49915 708/201 |
| 2018/0203670 A1* | 7/2018 | Carlough | G06F 7/491 |

OTHER PUBLICATIONS

"IEEE Standard for Binary Floating-Point Arithmetic," in ANSI/IEEE Std 754-1985, vol. No., pp. 1-20, Oct. 12, 1985, doi: 10.1109/IEEESTD.1985.82928. (Year: 1985).*

(Continued)

*Primary Examiner* — Emily E Larocque
*Assistant Examiner* — Markus Anthony Villanueva
(74) *Attorney, Agent, or Firm* — Oblon, McClelland, Maier & Neustadt, L.L.P.

(57) ABSTRACT

This disclosure represents an improved computer system and process to avoid the consequences of improper conversion of numbers and of rounding errors. This process makes the distinction between exact and inexact decimal floating-point numbers. If the result of a sequence of operation is exact, the user can trust that every decimal digit in the computed result is correct. On the other hand, if the input operands are inexact or the result cannot be computed exactly, a loss of significant digits occurs, and the user is warned of the loss. A novel representation is used for the inexact computed values. An estimate of the absolute error is also part of the representation.

20 Claims, 10 Drawing Sheets

(56) References Cited

OTHER PUBLICATIONS

S. Gonzalez-Navarro and J. Hormigo, "Normalizing or Not Normalizing? An Open Question for Floating-Point Arithmetic in Embedded Systems," 2017 IEEE 24th Symposium on Computer Arithmetic (ARITH), London, UK, 2017, pp. 188-195, doi: 10.1109/ARITH.2017.16. (Year: 2017).*
L.-K. Wang, M. A. Erle, C. Tsen, E. M. Schwarz and M. J. Schulte, "A survey of hardware designs for decimal arithmetic," in IBM Journal of Research and Development, vol. 54, No. 2, pp. 8:1-8:15, Mar.-Apr. 2010. (Year: 2010).*
L.-K. Wang, M. J. Schulte, J. D. Thompson and N. Jairam, "Hardware Designs for Decimal Floating-Point Addition and Related Operations," in IEEE Transactions on Computers, vol. 58, No. 3, pp. 322-335, Mar. 2009, doi: 10.1109/TC.2008.147. (Year: 2009).*
L.-K. Wang and M. J. Schulte, "Decimal Floating-Point Adder and Multifunction Unit with Injection-Based Rounding," 18th IEEE Symposium on Computer Arithmetic (ARITH '07), Montpellier, France, 2007, pp. 56-68. (Year: 2007).*
M. A. Erle, B. J. Hickmann and M. J. Schulte, "Decimal Floating-Point Multiplication," in IEEE Transactions on Computers, vol. 58, No. 7, pp. 902-916, Jul. 2009. (Year: 2009).*
Samy, et al. ; A Decimal Floating-Point Fused-Multiply-Add Unit ; Jul. 14, 2010 , (4 pages).

* cited by examiner

| S | G = Combination Field | T = Trailing coefficient field |
|---|---|---|
| 1 | $w+5$ bits | $10 \times k$ bits |

FIG. 1

PRIOR ART

| 1 | 5 bits | $w$ bits | $10 \times k$ bits |
|---|--------|----------|---------------------|
| S | L field | E = Exponent | T = Trailing coefficient field |

FIG. 2

| Name | Dec32 | Dec64 | Dec128 |
|---|---|---|---|
| Format length | 32 bits | 64 bits | 128 bits |
| Sign ($S$) | 1 bit | 1 bit | 1 bit |
| Leading field ($L$) | 5 bits | 5 bits | 5 bits |
| Exponent field ($E$) | 6 bits | 8 bits | 12 bits |
| Trailing field ($T$) | 20 bits | 50 bits | 110 bits |
| Precision $p$ | 7 digits | 16 digits | 34 digits |
| Biased exponent | $E = 0$ to $63$ | $E = 0$ to $255$ | $E = 0$ to $4095$ |
| Bias | 32 | 128 | 2048 |
| Exact value | $\pm C \times 10^{E-32}$ | $\pm C \times 10^{E-128}$ | $\pm C \times 10^{E-2048}$ |
| Inexact value | $\pm C.L \times 10^{E-32}$<br>$\pm C.H \times 10^{E-32}$ | $\pm C.L \times 10^{E-128}$<br>$\pm C.H \times 10^{E-128}$ | $\pm C.L \times 10^{E-2048}$<br>$\pm C.H \times 10^{E-2048}$ |

FIG. 3

| 5-bit $L$ field $L = a\,b\,c\,d\,e$ | Type | 4-bit Leading digit $d = w\,x\,y\,z$ |
|---|---|---|
| $L = 00cde$ = 0 to 7 | Exact | $d = 0cde$ = 0 to 7 |
| $L = 01cde$ = 8 to 15 | Inexact (.L fraction) | $d = 0cde$ = 0 to 7 |
| $L = 10cde$ = 16 to 23 | Inexact (.H fraction) | $d = 0cde$ = 0 to 7 |
| $L = 1100e$ = 24 to 25 | Exact | $d = 100e$ = 8 to 9 |
| $L = 1101e$ = 26 to 27 | Inexact (.L fraction) | $d = 100e$ = 8 to 9 |
| $L = 1110e$ = 28 to 29 | Inexact (.H fraction) | $d = 100e$ = 8 to 9 |
| $L = 11110$ = 30 | *Overflow* | $d = $ ---- |
| $L = 11111$ = 31 | *NaN* | $d = $ ---- |

FIG. 4

EXACT VERSUS INEXACT DECIMAL FLOATING-POINT NUMBERS AND COMPUTATION SYSTEM

TECHNICAL FIELD

The present disclosure is directed generally to improvements in the field of processor computation units, and, more particularly, to decimal floating-point computation units.

BACKGROUND

When different kinds of number representations are used together in complex engineering systems they can fail catastrophically and even cost lives. As digital computers are integrated into larger and larger physical systems, small errors must be avoided. Imperceptible errors could compound with repeated calculations and cause errors in missile defense, errors in spaceflight, or massive blackouts due to imprecise control of the power grid. As one example, on Jun. 4, 1996, the European Space Agency's unmanned Ariane 5 rocket exploded 39 seconds after liftoff. After a decade of development costing $7 billion, this 39 second voyage resulted in the loss of US$500 million worth of equipment. This confusion was caused by a rounding error in the inertial reference code that was being reused from the previous Ariane 4 rocket. A 64-bit floating point number representing the horizontal velocity of the rocket with respect to the platform was converted to a 16-bit signed integer, so there were 48 fewer number places. The 64 bit floating point number could not be accurately represented by a 16 bit integer. The conversion yielded a number that was larger than the largest possible number in the representation in the software from the slower Ariane 4. This caused an error message to be transmitted, which was then interpreted as a nonsensical number by the on-board computer, a self-destruct sequence was initiated, and the rocket was destroyed.

As demonstrated by this example, when one number is improperly converted in a computation, subsequent operations can result in a large overall error or even disaster. When almost everything in society is represented digitally in computers, almost everything in society is vulnerable to seemingly tiny errors. What is needed is a method and system to avoid these errors.

The Institute of Electrical and Electronics Engineers (IEEE) has existing standards to represent numbers, however, it has no current standard which indicate that numbers are an approximation. Small approximation errors are compounded by multiple calculations.

Background on Decimal Floating-Point and IEEE 754-2008

The IEEE 754-2008 standard was introduced as an improvement on the IEEE 754-1985 standard. The IEEE 754-2008 standard is structured into four levels. The first level defines a mathematical structure as an extended set of real numbers, including positive and negative infinity. Rounding maps an extended real number to a floating-point number. The relationship is many-to-one. The second level defines an algebraic closed system for floating-point data. A floating-point datum can be a signed zero, a finite non-zero number, signed infinity, or not-a-number (NaN). The third level defines a representation of the floating-point data and the fourth level defines binary encoding of the aforementioned floating-point data.

The decimal standard defines interchange data formats—decimal32, decimal64, and decimal128 of widths 32, 64, and 128 bits, respectively. FIG. 1 shows the standard decimal interchange floating-point data format used in all IEEE 754-2008 compliant implementations. The format has three fields: a sign bit s, a combination field, and a trailing significand field, as shown in FIG. 1. The combination field has w+5 bits that encode the leading digit of the significand and the biased exponent E. The trailing significand field has 10k bits (k declets) that encode 3k decimal digits. The significand is an integer coefficient C with p=3k+1 decimal digits, where p=7, 16, and 34 for decimal32, decimal64, and decimal128, respectively. The numeric value of a decimal float is: $(-1)^s \times C \times 10^{E-Bias}$.

The decimal standard defines two ways to encode a decimal significand. The first encoding scheme, known as Densely Packed Decimal (DPD), uses 10-bit declets to encode three decimal digits efficiently. DPD requires simple logic to unpack/pack the Binary-Coded Decimal (BCD) digits at the beginning/end of each operation (See, M. Cowlishaw, *Densely Packed Decimal Encoding, IEEE Proceedings—Computers and Digital Techniques*, vol. 149, p. 102-104, May 2002, which is incorporated herein by reference). Internally, a decimal floating-point unit uses BCD digits in computation operations.

The second encoding scheme uses a binary integer to encode the decimal significand. This is known as Binary Integer Decimal or BID encoding. This encoding scheme is simpler than DPD. However, it is more difficult to use in hardware implementations. To implement a decimal floating-point adder in hardware, left and right shifters are used to align the decimal significands. This works well for DPD encoding, which packs the BCD digits. However, BID encoding complicates the hardware alignment of the two significands and increases the cost of implementation. Left and right-shifting can be implemented as hardware multipliers by positive and negative powers of 10. However, negative powers of 10, such as $10^{-1}$ and $10^{-2}$, cannot be represented exactly in binary. For this reason, BID encoding is primarily used by software implementations that take advantage of binary hardware. The drawback of software libraries can, however, be speed. Operations implemented in software run 100× to 1000× slower than those implemented directly in hardware.

Unlike a binary floating-point number that has a unique normalized representation, a decimal number can have multiple representations. The set of representations a decimal number maps to is called the floating-point number's cohort (See, D. Zuraz, M. Cowlishaw, et al., *IEEE Standard for Floating-Point Arithmetic, IEEE Std* 754-2008, August 2008). If a non-zero number has n significant decimal digits (starting at its most significant non-zero digit and ending at its least significant non-zero digit), then there are (p−n+1) representations of the same number, where p is the precision. For example, the number 0.2 has 7 possible representations in dcecimal32: $0.2=2\times10^{-1}=20\times10^{-2}=\ldots=\mathbf{2000000\times10^{-7}}$. In particular, zero has a large cohort: the cohort of ±0 contains a representation for each exponent (See, D. Zuraz, M. Cowlishaw, et al., *IEEE Standard for Floating-Point Arithmetic, IEEE Std* 754-2008, August 2008, which is incorporated herein by reference).

The IEEE 754-2008 standard extended the original IEEE 754-1985 standard by adding decimal floating-point numbers. The new standard defined decimal interchange data formats, called decimal32, decimal64, and decimal128. The drawback of the binary floating-point is its inability to represent most decimal fractions exactly in binary. For example, the decimal fraction 0.7 becomes 0.699999988, when represented as a 32-bit binary float. The binary fraction is thus rounded to the required precision. Decimal floats are also rounded when a computed result is inexact. However, decimal floats use Radix-10 rounding rules that are more human centric. These decimal floats are typically used in financial calculations, commercial databases, banking, taxes, and currency conversions.

The IEEE 754-2008 standard is unable to distinguish between exact and inexact floating-point numbers. To understand the severity of errors in computations, consider adding four decimal64 numbers only in this specific order: S=(((A+B)+C)+D). Each decimal operand is represented with a sign bit, an integer coefficient having at most 16 decimal digits, which is the precision for decimal64, and a signed exponent (with a biased representation). All four input operands are assumed to be exact with zero error:

$A=9,876\times10^{+15}$,
$B=345,678\times10^{-2}$,
$C=-9,876,000,000,000,002\times10^{+3}$, and
$D=-99,999\times10^{-2}$ First, (A+B) is computed. Because of the difference in exponents, the coefficients of A and B must be aligned. According to IEEE 754-2008, the preferred exponent for addition is min(EA, EB). Because there are leading zeros, the coefficient of A must be left-shifted to the required precision (p=16 for decimal64). Therefore, $A=9,876,000,000,000,000\times10^{+3}$. To have equal exponents, the coefficient of B with the smaller exponent must be right shifted: $B=345,678\times10^{-2}=3.45678\times10^{+3}$. The coefficients of A and B are thereafter added and rounded: $(A+B)\approx9,876,000,000,000,003\times10^{+3}$. The result is inexact, but the relative error is very small $\approx4.625\times10^{-17}$.

Next, (A+B)+C is computed. The exponents are equal, and the operation is exact: $(A+B)+C=1\times10^{+3}$. However, the first input operand (A+B) is inexact. The exact sum should have been $145678\times10^{-2}=1.45678\times10^{+3}$. The overall relative error has therefore increased to: $0.45678\times10^{+3}/1.45678\times10^{+3}=31.355\%$.

Finally, $S=((A+B)+C)+D=1\times10^{+3}+-99,999\times10^{-2}=100,000\times10^{-2}+-99,999\times10^{-2}=1\times10^{-2}$. The last operation is also exact but the first input operand ($1\times10^{+3}$) is inexact with a large relative error. According to IEEE 754-2008, the integer coefficient must be left-shifted if it has leading zeros when adding the coefficient to a number of a lesser exponent. Therefore, $1\times10^{+3}$ becomes $100,000\times10^{-2}$. The computed sum S becomes $1\times10^{-2}$. However, the exact sum should be $45,679\times10^{-2}$. The relative error has increased to: $(45679-1)/45679=99.998\%$. To conclude, the relative error of a single inexact operation is typically very small. However, for a sequence of operations, the relative error can grow substantially.

The above example highlights a major problem of the IEEE 754-2008 decimal standard. The standard does not distinguish between exact and inexact decimal floating-point numbers. When an inexact number is propagated in a computation, subsequent operations can result in a large overall error, even when the later operations are exact. The standard does not warn the user about the magnitude of error in the computed results.

The above example shows the need to distinguish exact decimal numbers from inexact ones.

SUMMARY

This invention discloses a new floating-point decimal interchange format that distinguishes between exact and inexact numbers, and new computation methods that operate on both types of numbers. The disclosed methods can be implemented in hardware as decimal floating-point computation units in microprocessor cores, or as a software library.

The decimal interchange format and computation methods that are disclosed in this invention are different from and do not comply with the format and methods of the IEEE 754-2008 decimal floating-point standard.

The disclosed decimal floating-point format uses a unique representation for exact and inexact zeros that represent absolute errors in computations. It also defines special representation for overflow, underflow, and NaN (Not-a-Number) exceptional values that are propagated in a computation, when an exception occurs.

The computation methods, disclosed in this invention, comprise receiving two source operands that represent exact or inexact decimal floating-point numbers, and producing an exact or inexact decimal floating-point result. The ability to distinguish between exact and inexact operands and results increases the accuracy of the disclosed computation system.

Five computation methods are disclosed. They are used to compare, add, subtract, multiply, and divide decimal floating-point numbers. To have a unique representation, the computation methods always normalize an exact result if it has leading zeros. However, inexact results with leading zeros cannot be normalized.

Arithmetic on exact and inexact numbers should be done differently. This is the most important contribution of this invention.

Addition of Exact and Inexact Decimal Floating-Point Numbers

The IEEE 754-2008 standard defines an inexact operation when rounding takes place. However, there is nothing in the representation and binary encoding that indicates whether a floating-point number is exact or not. The ability to distinguish between exact and inexact floating-point numbers is essential to improving the accuracy and the quality of floating-point computation. If the result of a sequence of floating-point operations is exact, then the result is accurate, with infinite precision. On the other hand, if the result is inexact then it should be encoded as inexact with a representation that indicates the magnitude of the error.

Consider again adding the above four decimal numbers (A thru D), where all the input operands are exact:

$A=9,876\times10^{+5}$,
$B=345,678\times10^{-2}$
$C=-9,876,000,000,000,002\times10^{+3}$, and
$D=-99,999\times10^{-2}$ First, (A+B) is computed. Because the input operands are exact, the addition is done according to IEEE 754-2008. The coefficient of A must be left-shifted to the required precision (p=16 for decimal64). Therefore, $A=9,876,000,000,000,000\times10^{+3}$. The coefficient of B with the smaller exponent must be right shifted: $B=345,678\times10^{-2}=3.45678\times10^{+3}$. The coefficients of A and B are added: $(A+B)\approx9,876,000,000,000,003.L\times10^{+3}$.

The result of (A+B) is inexact. The .L notation disclosed in this invention does not exist in IEEE 754-2008. It defines a low fraction error in the computed result: 0.L<0.5. The result is not rounded. Instead, the .L notation is now part of the result representation.

Next, $(A+B)+C=9,876,000,000,000,003.L\times10^{+3}+-9,876,000,000,000,002\times10^{+3}=1.L\times10+3$. This catastrophic cancellation destroyed the most-significant digits. The result is inexact, even though the operation is exact.

Finally, $S=1.L\times10^{+3}+-99,999\times10^{-2}$. The number $1.L\times10^{+3}$ cannot be left-shifted because it is inexact. $1.L\times10^{+3}$ is not equal to $100,000.L\times10^{-2}$. Therefore, D must be right-shifted: $D=-0.99999\times10^{+3}$. This is a major difference and a deviation between this invention and the IEEE 754-2008 standard. Therefore, $S=((A+B)+C)+D=1.L\times10^{+3}+-$ $0.99999 \times 10^{+3} \approx 0.L \times 10^{+3}$. This requires a new type of inexact computation disclosed in this invention when one or both operands are inexact.

Therefore, $S=0.L \times 10^{+3}$ is an inexact result that represents an absolute error with zero significant digits. However, it is consistent with the true sum=$45,679 \times 10^{-2}$=$0.45679 \times 10^{+3}$. The user can see the loss of significant digits and the magnitude of the error. In contrast, the result computed according to the IEEE 754-2008 decimal standard ($S=1 \times 10^{-2}$) is unreliable and does not warn the user about the magnitude of the error.

The feedback provided by a computing system to the user should enable the addition of operands in a different order.

Consider computing first $(A+C)=9,876 \times 10^{+15}+-9,876,000,000,000,002 \times 10^{+3}$. Because A is exact with zero error, then left-shifting A is safe. Therefore, $(A+C)=9,876,000,000,000,000 \times 10^{+3}+-9,876,000,000,000,002 \times 10^{+3}$, which is equal to $-2 \times 10^{+3}$. This is also a catastrophic cancellation, but the computing system recognizes that the result is exact with zero error.

Next, $(A+C)+B=-2 \times 10^{+3}+345,678 \times 10^{-2}=-200,000 \times 10^{-2}+345,678 \times 10^{-2}=145,678 \times 10^{-2}$. The first operand can be left-shifted because it is exact. The result is also exact with zero error.

Finally, $S=((A+C)+B)+D=145,678 \times 10^{-2}+-99,999 \times 10^{-2}=45,679 \times 10^{-2}$. The computing system suggested in this invention can certify that the final computed result is exact with zero error.

BRIEF DESCRIPTION OF THE DRAWINGS

FIG. 1 shows the IEEE 754-2008 decimal interchange floating-point data format used by all IEEE 754-2008 compliant implementations in modern computer systems. This format does not distinguish between exact and inexact decimal numbers.

FIG. 2 shows the disclosed decimal interchange floating-point data format, introduced for the first time in this invention.

FIG. 3 shows the bitfield lengths of the disclosed decimal interchange floating-point format shown in FIG. 2. The decimal numbers can be of length 32, 64 and 128 bits.

FIG. 4 shows the encoding of the L field shown in FIG. 2. It encodes the leading digit of the significand. It indicates whether the decimal number is exact or inexact with a low or high fraction. Finally, it uses special encoding for the Overflow and NaN exceptional values.

DETAILED DESCRIPTION

Figure 5:
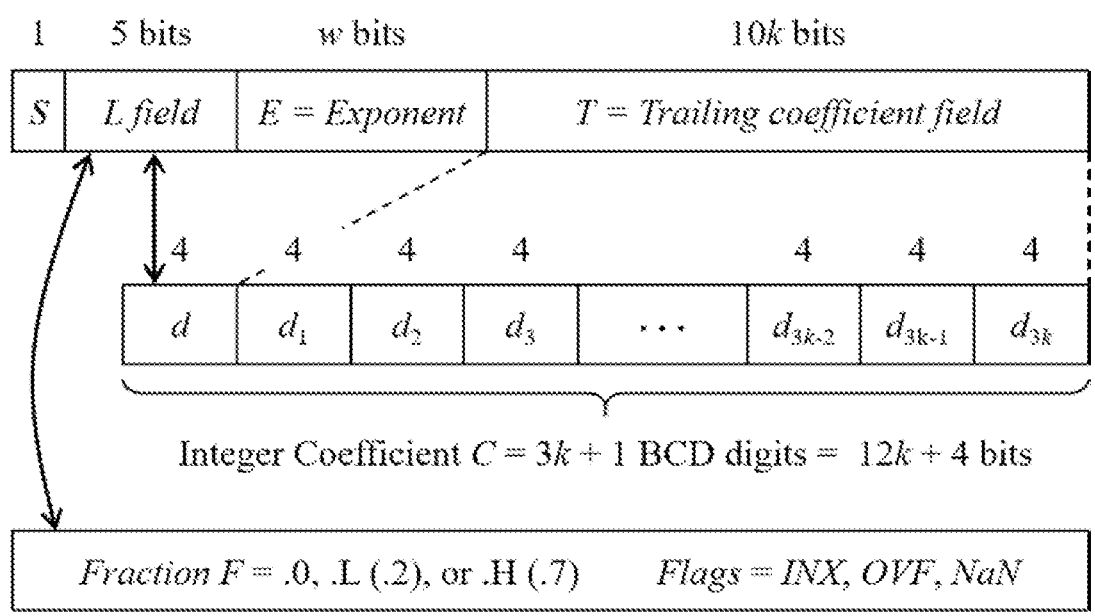
FIG. 5 shows the conversion of the L and T fields into the integer coefficient C and the Fraction F. The C coefficient has 3k+1 BCD digits. The leading digit d is encoded in the L field, while the remaining 3k digits are encoded in the T field. The fraction F is encoded in the L field. The flags indicate whether the decimal number is Inexact, Overflow, or NaN.

In the drawings, like reference numerals designate identical or corresponding parts throughout the several views. Further, as used herein, the words "a," "an," and the like generally carry a meaning of "one or more," unless stated otherwise. The drawings are generally drawn to scale unless specified otherwise or illustrating schematic structures or flowcharts.

The disclosed method/system focuses on making a distinction between exact and inexact decimal floating-point numbers. If the result of a sequence of operations is exact, every decimal digit in the computed result will be correct. However, if the input operands are inexact and/or the result cannot be computed exactly, significant digits may be lost during computation, and a specific representation is used by the disclosed method/system for the inexact computed result to identify the result as inexact. An estimate of the error is also given as part of the inexact computed result.

The disclosed method/system also defines computer-based arithmetic on inexact numbers. The use of inexact arithmetic eliminates the need for rounding, which simplifies hardware and software implementations, and ensures that users are warned that the results are inexact.

Exact Versus Inexact Decimal Numbers

The disclosed method/system distinguishes between exact and inexact decimal floating-point numbers and describes computation on both exact and inexact decimal floating-point numbers, which is not defined nor implemented by IEEE 754-2008.

An exact decimal floating-point number represents a single discrete value in the infinite continuum of real numbers and can be represented with zero error. An exact decimal number can be normalized. For example, the exact decimal number 0.2 can be represented uniquely as $2,000,000 \times 10^{-7}$ with p=7 decimal digits.

Conversion of an exact decimal32 number into a decimal64 number is performed by appending trailing zeros to a significand and adjusting the exponent accordingly. For example, $0.2=2,000,000 \times 10^{-7}$, with p=7 decimal digits can be normalized to become $2,000,000,000,000,000 \times 10^{-16}$, with p=16 decimal digits when converted into decimal64. However, converting an exact decimal64 number into a decimal32 number may produce an inexact number if even one of the nine trailing decimal digits that are removed from the significand is not zero. An inexact decimal number cannot, however, be represented exactly with finite precision. An inexact representation of π is $3,141,592.H \times 10^{-6}$, with p=7 digits, where 0.H represents a high fraction ($0.5 \leq 0.H < 1$). The absolute error here is $0.H \times 10^{-6}$. An inexact representation of 7 with p=16 digits is $3,141,592,653,589,793.L \times 10^{-15}$, where 0.L represents a low fraction ($0 \leq 0.L < 0.5$). The absolute error here is $0.L \times 10^{-15}$.

Converting an inexact number, such as π, from p=7 to p=16 decimal digits does not increase its precision. Leading zeros are inserted: $\pi=0,000,000,003,141,592.H \times 10^{-6}$. If an inexact number is not normalized, then it cannot be left-shifted and normalized because the trailing digits are unknown. Therefore, inexact decimal numbers may or may not be normalized. Such inexact decimal numbers typically have .L or .H representations that indicate low or high fraction intervals: 0.L=[0, 0.5) and 0.H=[0.5, 1).

An inexact number can be the result of an operation with exact operands. However, unlike the IEEE 754 standard, this invention does not use rounding. An inexact number is always encoded with .L or .H fraction that represents an interval in the infinite continuum of real numbers.

Exact Versus Inexact Zeros

The IEEE 754-2008 decimal standard defines only exact zero as a large cohort with a zero significand and an arbitrary value of an exponent field: zero=±0×10$^q$ for any exponent value q. There is no unique representation of the exact zero and no definition of the inexact zero. However, the disclosed method/system distinguishes between exact and inexact zeros. Exact zero has a zero significand and a zero biased exponent (E=0). It is written as 0 (sign bit is ignored). However, inexact zeros are many and written as: ±0.L×10$^q$ or ±0.H×10. Inexact zeros represent errors in computations. The significand is either 0.L or 0.H. However, the exponent q indicates the scale of the error.

The value of (x−x) is exact zero when x is exact, but an inexact zero when x is inexact. For a given coefficient C and exponent q, (C.L×10$^q$−C.L×10$^q$) is 0.L×10$^q$. Similarly, (C.H×10$^q$−C.H×10$^q$) is also 0.L×10$^q$.

Improved Decimal Format

The disclosed method/system suggests a new format for exact and inexact decimal numbers. FIG. 2 shows this improved decimal interchange floating-point data format. This new format consists of four fields: a sign bit S, a leading digit field L having exactly 5 bits, that encodes the first digit of the coefficient and specifies whether the number is exact or not, a biased exponent field E having w bits, and a trailing coefficient field T having 10×k bits that encode the trailing 3×k decimal digits of the coefficient.

FIG. 3 defines the field length in bits and values of the proposed decimal numbers of length 32, 64, and 128 bits. The exponent field consists of w bits. The biased exponent range for a finite decimal number is E=0 to $2^w-1$, and the Bias is $2^{w-1}$.

Binary Encoding

The 5-bit L field indicates whether a decimal number is exact or not and encodes the leading digit d of the integer coefficient C. The 5-bit L field encoding is shown in FIG. 4. The first 24 values (0 to 23) encode the leading digit d=0 to 7. They are divided into 3 groups. The first group (ab=00) specifies an exact decimal number. The second and third groups (ab=01 and 10) specify an inexact decimal number with a trailing .L or .H fraction, respectively.

The leading digit d of a normalized exact decimal number should not be 0 and is between 1 and 9. Exact decimal numbers should be normalized to avoid multiplicity of representations. The only exception is, when the biased exponent E is 0, the leading digit d can be 0 only for subnormal decimal numbers. Therefore, there is a unique encoding of exact zero: L=E=T=0.

The next 6 encoded values of the L field (24 to 29) encode the leading digit d=8 to 9. They are also divided into 3 groups, according to cd=00 (exact), 01 (inexact .L fraction), or 10 (inexact .H fraction). The last two values of the L field encode the specific value of Overflow (L=30) and NaN (L=31).

FIG. 5 shows the decoding of the 5-bit L field into a 4-bit leading digit d and a fraction F. Given that the 5-bit L field=abcde and the 4-bit digit d=wxyz, then d=0cde when L is 0 to 23, d=100e when L is 24 to 29, and d is a don't care when L=30 or 31. The logic equations are: w=a&b, x=c&~w, y=d&~w, and z=e. The fraction F can be exact 0.0, inexact low (.L), or inexact high (.H). Three flags are used: INX indicates that a decimal number is inexact, OVF indicates that a decimal number is Overflow, and NaN indicates that a decimal number is Not-a-Number.

The trailing significant field T is encoded using densely packed decimal (DPD). Each 10-bit declet is unpacked into three BCD digits (See, M. Cowlishaw, "*Densely Packed Decimal Encoding*", IEEE Proceedings—Computers and Digital Techniques, vol. 149, p. 102-104, May 2002, which is incorporated herein by reference).

The significand of an exact decimal number is an integer coefficient C, which is the concatenation of the leading digit d of the L field and the 3k digits in T, as shown in FIG. 5. The value is ±C×10$^q$, where q=E−Bias=E−$2^{w-1}$. The significand of an inexact decimal number is either C.L or C.H with a low or high fraction. The value of an inexact decimal number is either ±C.L×10$^q$ or ±C.H×10$^q$. The precision for Dec32, Dec64, and Dec128 is either p=7, 16, and 34, respectively.

Exception-Free Computing

The IEEE 754-2008 standard defines five kinds of exceptions that can be caught in a given computation. These are: invalid operation, division by zero, overflow, underflow, and inexact. According to IEEE 754-2008, an exception is signaled by setting a flag in a hardware register, or by taking a trap.

The disclosed method/system replaces all signaling operations with exception free quiet operations. An inexact operation produces an inexact result, which can be ±C.L×10$^q$ or ±C.H×10$^q$. Rounding is not performed and a hardware flag is not used. Underflow is represented as an inexact zero with minimum exponent, which can be ±0.L×10$^{-Bias}$ or ±0.H×10$^{-Bias}$. Underflow is not rounded or reduced to exact zero.

Overflow is a signed value represented by L=30, as shown in FIG. 4. Overflow values are outside the range of representable numbers (E>Emax).

For any finite number x, −overflow<x<+overflow. Dividing a non-zero value x by exact zero also produces overflow.

An invalid operation, such as dividing zero by zero or adding +overflow to −overflow, produces a NaN result. NaN values are unordered and cannot be compared. The 5-bit L field encodes the special values of overflow and NaN, as shown in FIG. 4.

Comparing Exact and Inexact Decimal Floating-Point Numbers

According to IEEE 754-2008, floating-point numbers are ordered, except for NaN. Given two floating-point numbers, there are four mutually exclusive relations: equality (EQ), less than (LT), greater than (GT), or unordered (UN). Two rounded numbers can be equal even when they represent different real numbers.

In this disclosed invention, equality has two meanings. It can be exact or inexact. Two finite decimal numbers x and y are exactly equal if they are both exact and have identical values. If x and y are exactly equal, then their difference (x−y) is exact zero.

On the other hand, approximate equality (AE) is used when at least one decimal number is inexact. For example, given that x=31415.H×10$^{-4}$ and y=314.L×10$^{-2}$ are two approximations of 1 with different exponents and significant digits, then x and y must be aligned. The significand of x is right shifted: x=31415.H×10$^{-4}$=314.15H×10$^{-2}$~314.L×10$^{-2}$ indicating that x is approximately equal to y. Similarly, if $z=3141000 \times 10^{-6}$ is an exact decimal number with p=7 digits, then $z=314.1 \times 10^{-2} \sim 314.L \times 10^{-2}$ is also approximately equal to y. However, $z=31410.0 \times 10^{-4}$ is less than $x=31415.H \times 10^{-4}$ when aligning z to x. This example shows that approximate equality is not transitive, while exact equality is transitive.

Figure 6:
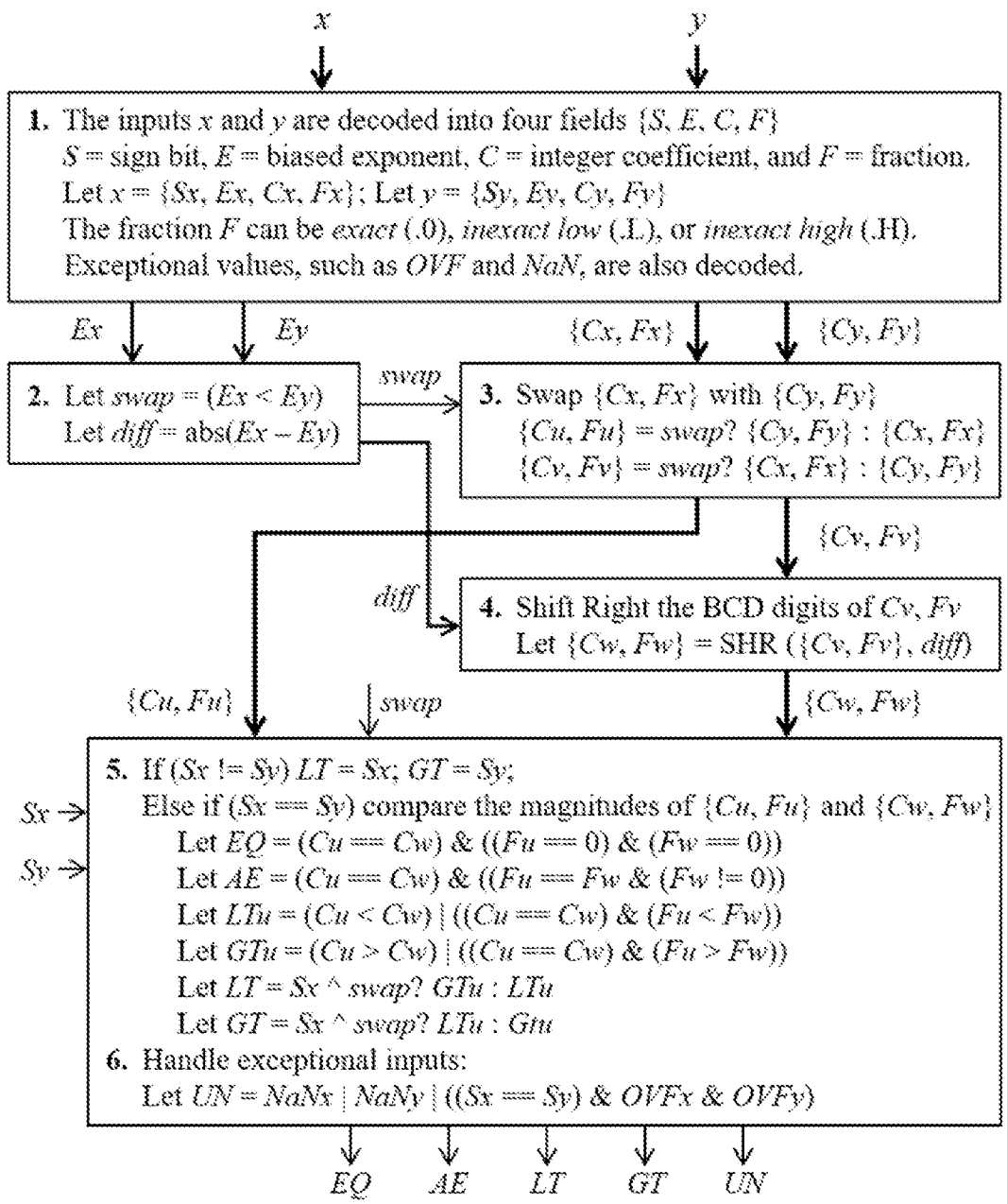
FIG. 6 shows the dataflow graph (flowchart) of a computation method for comparing two exact or inexact decimal floating-point numbers in accordance to the format of FIG. 5. The computation method can be implemented in hardware or software.

FIG. 6 shows a dataflow graph (flowchart) of a computation method for comparing the values of two decimal floating-point numbers x and y. The computation method can be implemented in hardware or software.

The first step extracts all the fields of x and y in accordance to the format disclosed in FIG. 5. The integer coefficient C is extracted from the L and T fields. The fraction F and flags are extracted from the L field only. In particular, the flags indicate whether the number is inexact, overflow, or NaN. This first step is common in all computation methods.

The second step compares the exponents Ex and Ey and computes their absolute difference: diff=abs(Ex−Ey).

Step 3 swaps the significands {Cx, Fx} and {Cy, Fy}, if Ex is less than Ey. The outputs of this step are: {Cu, Fu} and {Cv, Fv}.

Step 4 shifts right the significand {Cv, Fv} according to the exponent difference. The output is a shifted significand {Cw, Fw}=SHR({Cv, Fv}, diff). This step aligns {Cu, Fu} and {Cw, Fw} to have a common exponent, which is max(Ex, Ey).

Step 5 compares the aligned significands {Cu, Fu} and {Cw, Fw}. If the sign bits Sx and Sy are different, then the comparison result depends only on the sign bits: LT Sx and GT=Sy. If Sx and Sy are identical then the magnitudes of {Cu, Fu} and {Cw, Fw} are compared for exact equality (EQ), approximate equality (AE), less than (LTu={Cu, Fu}<{Cw, Fw}), and greater than (GTu={Cu, Fu}>{Cw, Fw}). The LT (x<y) and GT (x>y) outputs are computed based on the sign bit Sx and whether swap occurred in Step 3.

Step 6 handles exceptional inputs. If an input is NaN then the comparison result is unordered (UN). Similarly, if both inputs are overflow values of the same sign, then the comparison result is also unordered (UN).

Decimal Addition and Subtraction

The IEEE 754-2008 standard defines addition and subtraction operations on decimal floating-point numbers that are assumed to be exact. However, the IEEE computation method does not handle inexact input operands properly. It might fail and produce incorrect results when one or both input operands are inexact.

Figure 7:
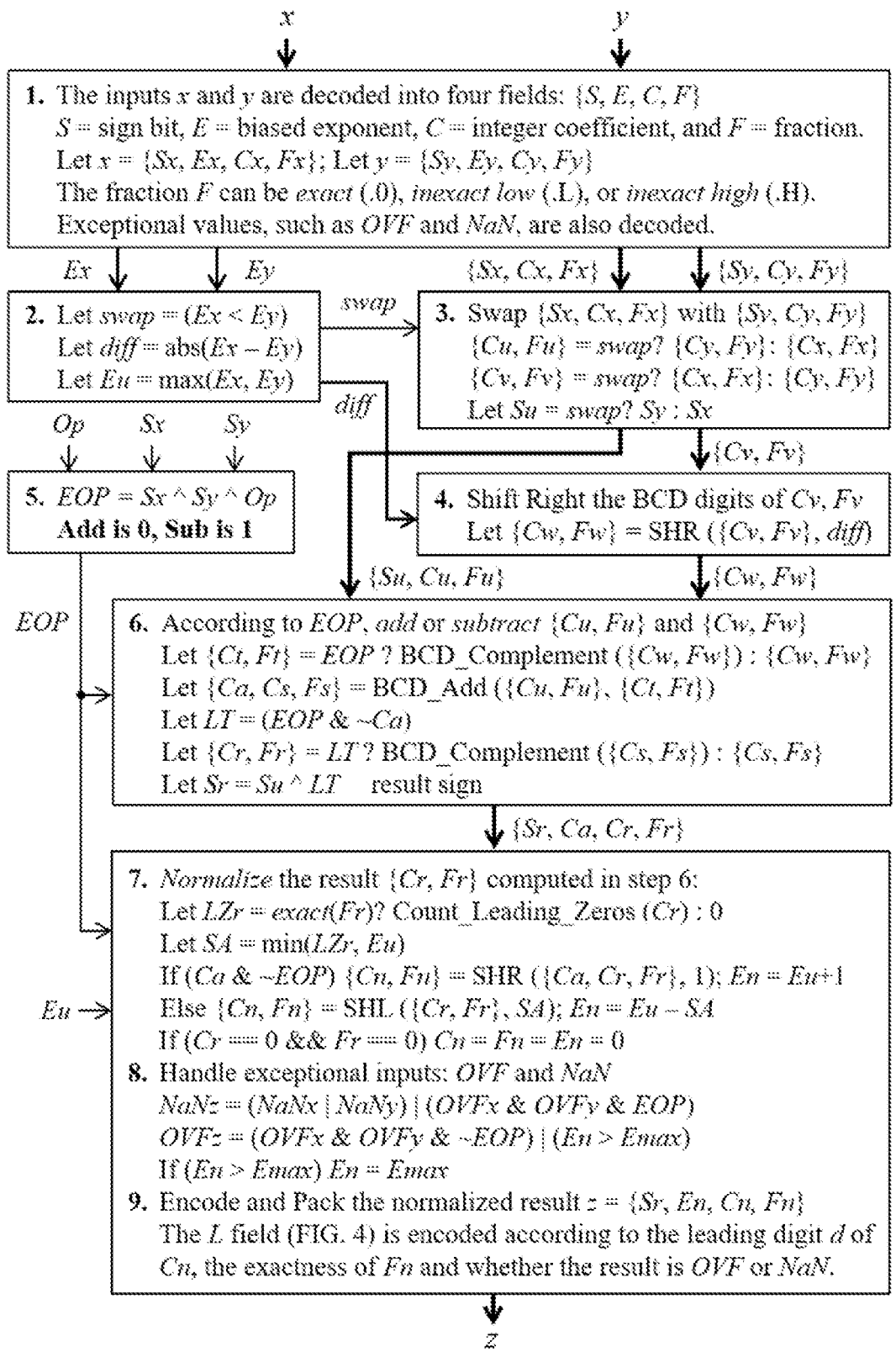
FIG. 7 shows the dataflow graph (flowchart) of a computation method for adding and subtracting two exact or inexact decimal floating-point numbers in accordance to the format of FIG. 5. The computation method can be implemented in hardware or software.

FIG. 7 discloses a dataflow graph (flowchart) of a computation method for adding and subtracting two decimal floating-point numbers x and y that can be exact or inexact. The computation method can be implemented in hardware or software.

Step 1 extracts all the fields of x and y in accordance to the format disclosed in FIG. 5. The integer coefficient C is extracted from the L and T fields. The fraction F and flags are extracted from the L field only. In particular, the flags indicate whether the number is inexact, overflow, or NaN. This first step is common in all computation methods.

Step 2 compares the exponents Ex and Ey and computes their absolute difference: diff=abs(Ex−Ey). It also computes Eu=max(Ex, Ey), which is the common exponent for the aligned significands.

Step 3 swaps the significands {Cx, Fx} and {Cy, Fy}, if Ex is less than Ey. It also swaps the sign bits to select the sign Su of the swapped significand {Cu, Fu}. The output of the third step are the swapped {Su, Cu, Fu} and {Cv, Fv}.

Step 4 shifts right the significand (Cv, Fv) according to the exponent difference. The output of this step is a shifted significand (Cw, Fw)=SHR(Cv, Fv, diff). This step aligns (Cu, Fu) and (Cw, Fw) to have a common exponent, which is Eu.

Step 5 determines the effective operation EOP=Sx^Sy^Op, where ^ is the XOR operator. This step can be done in parallel and does not depend on the previous steps.

Step 6 adds or subtracts the aligned significands {Cu, Fu} and {Cw, Fw}, according to the effective operation EOP. For subtraction, the BCD (ten's) complement of {Cw, Fw} is computed. Subtraction is converted into addition to the ten's complement. The computed sum is {Cs, Fs}. For subtraction, the LT flag indicates whether the computed sum {Cs, Fs} is negative (i.e., whether {Cu, Fu} is less than {Cw, Fw}). If the computed sum is negative, then it should be post-corrected to become {Cr, Fr}=ten's complement of {Cs, Fs}, which is its absolute value. The result sign is computed as Sr=Su^LT, where ^ is the XOR operator.

The addition and subtraction of inexact decimal floating-point numbers requires arithmetic on the 0.L and 0.H fractions, where 0.L and 0.H are the [0, 0.5) and [0.5, 1) intervals, respectively. One choice is to use interval arithmetic. For example, 0.L+0.L can be 0.L or 0.H, 0.L+0.H can be 0.H or 1.L, and 0.H+0.H can be 1.L or 1.H. Similarly, 0.L−0.L and 0.H−0.H can be ±0.L, 0.H−0.L can be 0.H or 0.L, and 0.L−0.H can be −0.H or −0.L. The drawback of interval arithmetic is that it requires two endpoints to represent the result, and intervals become complex over a sequence of operations, which in turns complicates the implementation of the operation.

The arithmetic on inexact decimal floating-point numbers, which is disclosed in this invention, is inexact and does not always guarantee a correct result. However, it produces more reliable results than those obtained according to IEEE 754-2008.

Inexact addition to ±0.L and ±0.H is shown in Table 1. It uses digit injection. The 0.L and 0.H fractions become 0.2 and 0.7, respectively, with an injected BCD fraction digit. The result of inexact addition is an approximation, not an interval. For example, 0.L+0.L becomes 0.2+0.2≈0.4≈0.L (not 0.H). Similarly 0.L+0.H becomes 0.2+0.4≈0.6≈0.H (not 1.L), and 0.H+0.H≈1.L (not 1.H). Inexact subtraction of (0.L−0.L) and (0.H−0.H) are defined to be +0.L (not −0.L). However, (−0.L+0.L) and (−0.H+0.H) are defined to be equal to −0.L. The remaining entries in Table 1 are derived consistently.

TABLE 1

| Inexact addition to ±0.L and ±0.H | | | | |
|---|---|---|---|---|
| + | +0.L | +0.H | −0.L | −0.H |
| +0.L | +0.L | +0.H | +0.L | −0.H |
| +0.H | +0.H | +1.L | +0.H | +0.L |
| −0.L | −0.L | +0.H | −0.L | −0.H |
| −0.H | −0.H | +0.L | −0.H | −1.L |

Digit injection is also used for adding and subtracting an inexact fraction with a shifted significand. For example, (0.L+0.4) becomes (0.2+0.4)≈0.H. Similarly, (0.L−0.4) becomes (0.2−0.4)≈−0.L.

Step 7 normalizes the result {Cr, Fr} computed in step 6 and adjusts the common exponent Eu. It outputs a normalized significand {Cn, Fn} and exponent En. If the result computed in step 6 has an extra carry digit, then {Ca, Cr, Fr} is shifted right one BCD digit, and the exponent Eu is incremented. If the {Cr, Fr} result, computed in step 6, is exact but with leading zero digits, it is shifted left according to the count LZr of leading zeros in Cr. The left shift amount SA=min(LZr, Eu) in case Eu is close to zero, to avoid having a negative biased exponent. The exponent Eu is also decremented by SA. However, an inexact result with leading zeros cannot be normalized. If {Cr, Fr} is exact zero, then En is reduced to zero. The normalization step is necessary to produce a unique representation of the result.

Step 8 handles exceptional inputs and produces exceptional results (Overflow and NaN). Adding a finite number to overflow produces overflow. Subtracting two overflow values produces NaN. Adding any value x to NaN produces NaN.

Step 9 encodes and packs the normalized result z, with sign bit Sr, normalized exponent En, and normalized significand {Cn, Fn}. The L field, shown in FIGS. 4 and 5, is encoded according to the leading digit d of Cn, the fraction Fn, and whether the result is exceptional (Overflow or NaN). The T field, shown in FIG. 5, is packed according to the trailing 3k BCD digits in Cn.

To demonstrate the computation method of FIG. 7, Table 2 shows two addition examples with precision p=7 decimal digits. The first example is the addition of two exact negative numbers x and y. The effective operation EOP is add. A carry Ca is generated, and {Ca, Cr, Fr} is shifted right to become {Cn, Fn}. The exponent En is incremented. The result z is negative and inexact with high fraction, even though the input operands are exact.

TABLE 2

Addition Examples according to the method of FIG. 7

| | | |
|---|---|---|
| Inputs | $x = -6254763 \times 10^{-5}$ | $x = -1076528.H \times 10^{-2}$ |
| | $y = -9877012 \times 10^{-4}$ | $y = +1145678 \times 10^{-2}$ |
| Step 1 | Sx = 1, Sy = 1 (negative) | Sx = 1, Sy = 0 |
| | Ex = −5 + bias, Ey = −4 + bias | Ex = −2 + bias, Ey = −2 + bias |
| | Cx = 6254763, Fx = 0 | Cx = 1076528, Fx = H |
| | Cy = 9877012, Fy = 0 | Cy = 1145678, Fy = 0 |
| Step 2 | swap = 1 (true) | swap = 0 (false) |
| | diff = abs (−5 − −4) = 1 | diff = abs (−2 − −2) = 0 |
| | Eu = Ey = −4 + bias | Eu = Ex = −2 + bias |
| Step 3 | {Cu, Fu} = {9877012, 0} | {Cu, Fu} = {1076528, H} |
| | {Cv, Fv} = {6254763, 0} | {Cv, Fv} = {1145678, 0} |
| | Su = Sy = 1 | Su = Sx = 1 |
| Step 4 | {Cw, Fw} = {0625476, 3} | {Cw, Fw} = {1145678, 0} |
| Step 5 | EOP = 0 (Add) | EOP = 1 (Subtract) |
| Step 6 | {Ct, Ff} = {0625476, 3} | {Ct, Ft} = {8854322, 0} |
| | {Ca, Cs, Fs} = {1, 0502488, 3} | {Ca, Cs, Fs} = {0, 9930850, 7#} |
| | LT = 0, Sr = 1 | LT = 1, Sr = 0 |
| | {Cr, Fr} = {0502488, 3} | {Cr, Fr} ={0069149, 3#} |
| Step 7 | LZr = 1; SA = 1 | LZr = 0 (inexact Fr), SA = 0 |
| | {Cn, Fn} = {1050248, 8#} | {Cn, Fn} = {0069149, 3#} |
| | En = Eu + 1 = −3 + bias | En = Eu = −2 + bias |
| Step 8 | No exceptional input or output | No exceptional input or output |
| Step 9 | $z = -1050248.H \times 10^{-3}$ | $z = +0069149.L \times 10^{-2}$ |

The second example is the addition of an inexact negative number x to an exact positive number y. The exponents are identical and there is no swapping or shifting of the second operand. The effective operation EOP is subtract because the sign bits (Sx and Sy) are different. {Ct, Ft} is the BCD (ten's) complement of {Cw, Fw}. Subtraction is converted into addition to the ten's complement. The LT flag is set to 1 because the carry flag Ca is zero for subtraction. It indicates that {Cu, Fu} is less than {Cw, Fw}. The result significand {Cr, Fr} is post-corrected by computing the ten's complement of {Cs, Fs}. The result sign Sr becomes positive. The result significand {Cr, Fr} cannot be left-shifted and normalized, because Fr is inexact. The result z is positive and inexact with a low fraction.

Decimal Multiplication

Unlike addition and subtraction, floating-point multiplication does not require the alignment of significands when the exponents are different. To multiply two decimal floating-point numbers, their decimal significands are multiplied, and their exponents are added. The result significand is normalized to the required precision. If at least one of the shifted-out fraction digits is non-zero, the result becomes inexact. The last shifted-out decimal digit indicates a low or high fraction.

If an input operand is inexact with reduced precision, the result coefficient is restricted to have a precision in accordance to the minimum precision of its input operands. Digit injection is used to approximate 0.L and 0.H as 0.2 and 0.7, respectively.

Figure 8:
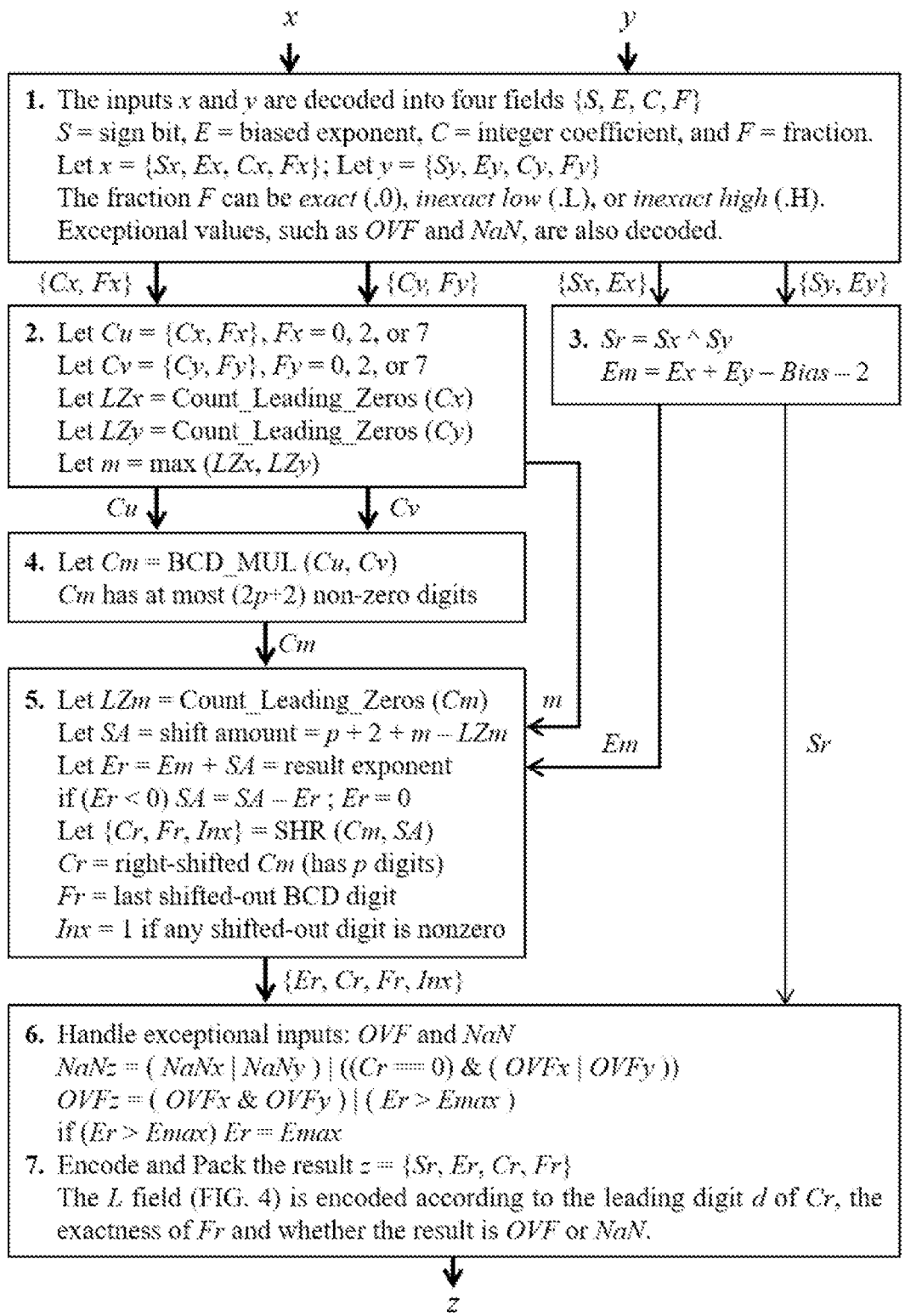
FIG. 8 shows the dataflow graph (flowchart) of a computation method for multiplying two exact or inexact decimal floating-point numbers in accordance to the format of FIG. 5. The computation method can be implemented in hardware or software.

FIG. 8 discloses a dataflow graph (flowchart) of a computation method for multiplying two decimal floating-point numbers x and y that can be exact or inexact. The computation method can be implemented in hardware or software.

Step 1 extracts all the fields of x and y in accordance to the format disclosed in FIG. 5. The integer coefficient C is extracted from the L and T fields. The fraction F and flags are extracted from the L field only. In particular, the flags indicate whether the number is inexact, overflow, or NaN. This first step is common in all computation methods.

Step 2 injects Fx and Fy (0, 2, or 7) into Cx and Cy to produce Cu and Cv, each having (p+1) decimal digits, where p is the precision. This step also counts the maximum number of leading zeros in both coefficients Cx and Cy: m=max(LZx, LZy). This is needed when an input is inexact to determine the precision of the result.

Step 3 computes the sign of the result Sr=Sx^Sy, where ^ is the XOR operator. It also adds the biased exponents Ex and Ey, subtracting the bias: Em=Ex+Ey−Bias−2.

Step 4 multiplies the significands: Cm=Cu×Cv, where Cm can have at most (2p+2) nonzero BCD digits. The extra two are the injected fraction digits.

Step 5 computes LZm, which is the count of leading zeros in Cm. It determines the right shift amount according to the precision p, m and LZm: SA=p+2+m−LZm. It computes the result exponent Er and increases the shift amount SA if Er is negative. It shifts right the Cm product. The output is a shifted significand {Cr, Fr}=SHR (Cm, SA) and an inexact flag Inx that indicates whether any shifted-out digit is nonzero. The result coefficient Cr has p decimal digits and Fr is a single decimal fraction digit.

Step 6 handles exceptional inputs and produces exceptional results. If any input is NaN, the product is NaN. Multiplying two overflow values produces overflow. If the product exponent Er exceeds the maximum biased exponent Emax then the result is overflow.

Step 7 encodes and packs the result z, with sign bit Sr, exponent Er, and significand {Cr, Fr}. The L field, shown in FIGS. 4 and 5, is encoded according to the leading digit d of Cr, the fraction Fr, and whether the result is exceptional (Overflow or NaN). The T field, shown in FIG. 5, is packed according to the trailing 3k BCD digits in Cr.

To demonstrate the computation method of FIG. 8, Table 3 shows two multiplication examples with precision p=7 decimal digits. The first example is the multiplication of two exact negative numbers x and y. The number of leading zero digits is always zero for exact numbers. The fraction digit is also zero. The product of two 8-digit decimal numbers produces a product with 16 digits. However, only p=7 digits should be kept. The shift amount is SA=9 digits. The product is exact because all the shifted-out digits are zeros.

TABLE 3

Multiplication examples according to the method of FIG. 8

| | | |
|---|---|---|
| Inputs | x = −6250000 × $10^{-5}$ | x = −0017652.H × $10^{-2}$ |
| | y = −9877000 × $10^{-4}$ | y = +0145678.L × $10^{-3}$ |
| Step 1 | Sx = 1, Sy = 1 (negative) | Sx = 1, Sy = 0 |
| | Ex = −5 + Bias, Ey = −4 + Bias | Ex = −2 + Bias, Ey = −3 + Bias |
| | Cx = 6250000, Fx = 0 | Cx = 0017652, Fx = H |
| | Cy = 9877000, Fy = 0 | Cy = 0145678, Fy = L |
| Step 2 | Cu = {6250000, 0} | Cu = {0017652, 7} |
| | Cv = {9877000, 0} | Cv = {0145678, 2} |
| | LZx = 0; LZy = 0; m = 0 | LZx = 2; LZy = 1; m = 2 |
| Step 3 | Sr = 0 (Positive) | Sr = 1 (Negative) |
| | Em = −11 + Bias | Em = −7 + Bias |
| Step 4 | Cm = 6,173,125,000,000,000 | Cm = 0,000,257,161,356,114 |
| Step 5 | LZm = 0; SA = 9 | LZm = 4; SA = 7 |
| | Er = −2 + Bias | Er = 0 + Bias |
| | {Cr, Fr, Inx} = {6173125, 0, 0} | {Cr, Fr, Inx} = {0025716, 1, 1} |
| Step 6 | No exceptional input or output | No exceptional input or output |
| Step 7 | z = +6173125 × $10^{-2}$ | z = −0025716.L × $10^0$ |

The second example is the multiplication of two inexact decimal numbers x and y. The number of leading zero digits in the coefficients of x and y is LZx=2 and LZy=1, respectively, with a maximum m=2. This indicates that the product coefficient cannot have more significant digits than its input operands, when they are inexact. The injected high and low fraction digits are 7 and 2, respectively. The computed product Cm has four leading decimal zeros (LZm=4). The shift amount becomes SA=7 to keep only five significant digits in the final product coefficient Cr. The result z is negative and inexact with a low fraction.

Decimal Division

Given two finite decimal floating-point numbers x and y, the significand of x is divided by the significand of y, and the exponents are subtracted. The result is then normalized to the required precision. If an input operand is inexact with reduced precision, the result coefficient is restricted to have a precision in accordance to the minimum precision of its input operands. Digit injection is used to approximate 0.L and 0.H as 0.2 and 0.7, respectively.

Figure 9:
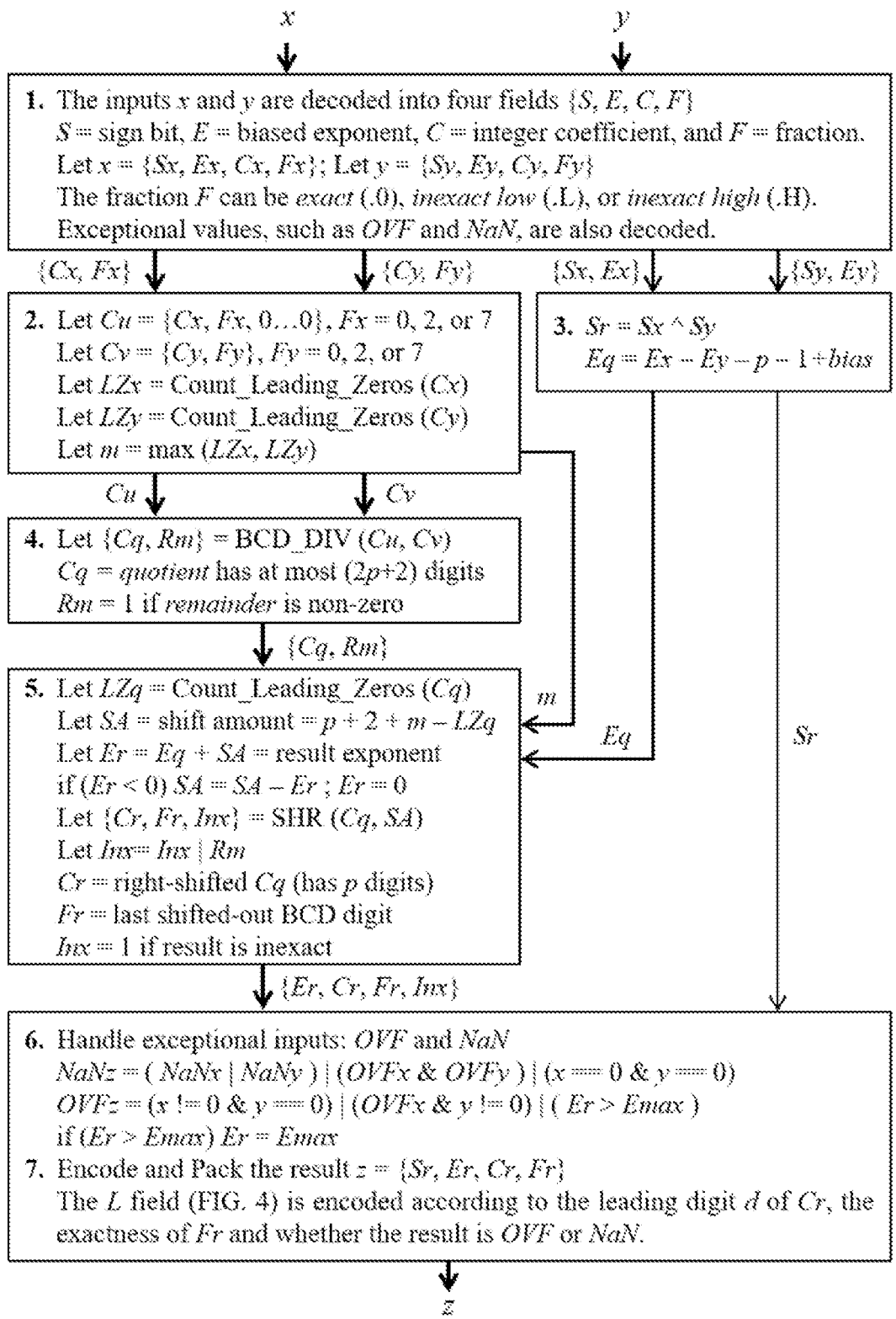
FIG. 9 shows the dataflow graph (flowchart) of a computation method for dividing two exact or inexact decimal floating-point numbers in accordance to the format of FIG. 5. The computation method can be implemented in hardware or software.

FIG. 9 discloses a dataflow graph (flowchart) of a computation method for dividing two decimal floating-point numbers x and y that can be exact or inexact. The computation method can be implemented in hardware or software.

Step 1 extracts all the fields of x and y in accordance to the format disclosed in FIG. 5. The integer coefficient C is extracted from the L and T fields. The fraction F and flags are extracted from the L field only. In particular, the flags indicate whether the number is inexact, overflow, or NaN. This first step is common in all computation methods.

Step 2 injects Fx (0, 2, or 7) and (p+1) decimal zeros into Cx to produce a coefficient Cu having (2p+2) decimal digits, where p is the precision. It also injects Fy (0, 2, or 7) into Cy to produce a coefficient Cv having (p+1) decimal digits. This step also counts the maximum number of leading zeros in both coefficients Cx and Cy: m=max(LZx, LZy). This is needed when an input operand is inexact to determine the precision of the result.

Step 3 computes the sign of the result Sr=Sx^Sy, where ^ is the XOR operator. It also computes the biased exponent of the quotient: Eq=Ex−Ey−p−1+Bias.

Step 4 divides the extended decimal coefficients: Cq=Cu/Cv. This step produces a quotient Cq having at most (2p+2) decimal digits, and a remainder flag Rm that indicates whether division is inexact (Rm can be 1 or 0).

Step 5 computes LZq, which is the count of leading zeros in Cq. It determines the right shift amount according to the precision p, m and LZq: SA=(p+2+m−LZq). It computes the result biased exponent Er and increases the shift amount SA if Er is negative. It shifts right the Cq quotient. The output is a shifted significand {Cr, Fr}=SHR (Cq, SA) and an inexact flag Inx that indicates whether any shifted-out digit is nonzero. The result coefficient Cr has p decimal digits. The result fraction Fr is a single decimal digit.

Step 6 handles exceptional inputs and produces exceptional results. If any input is NaN, the result is NaN. Dividing two overflow values or two zero values also produces NaN. Dividing a non-zero value by zero produces overflow. If the product exponent Er exceeds the maximum biased exponent Emax then the result is also overflow.

Step 7 encodes and packs the result z, with sign bit Sr, exponent Er, and significand {Cr, Fr}. The L field, shown in FIGS. 4 and 5, is encoded according to the leading digit d of Cr, the fraction Fr, and whether the result is exceptional (Overflow or NaN). The T field, shown in FIG. 5, is packed according to the trailing 3k BCD digits in Cr.

To demonstrate the computation method of FIG. 9, Table 4 shows two division examples with precision p=7 decimal digits. The first example is the division of two exact numbers x and y. The number of leading zeros is always zero for an exact number. The fraction digit is also zero.

The coefficient Cu is the concatenation of Cx, fraction Fx, and eight decimal zeros. The coefficient Cv is the concatenation of Cy and Fy. The maximum number of leading zeros in Cx and Cy is m=0 because x and y are exact. The result sign is Sr=0 (positive) and the quotient exponent is Eq=−9+Bias, which is the exponent of Cq=Cu/Cv.

The coefficient Cu is divided by Cv to produce a quotient Cq that can have at most (2p+2)=16 decimal digits. The remainder flag Rm indicates that the remainder is not zero. The count of leading zeros in Cq is LZq=8. The shift amount SA=1 to keep only 7 significant digits. The result coefficient Cr is computed by shifting right Cq. The fraction Fr is the last shifted-out decimal digit. The result exponent Er is incremented in accordance to the shift amount SA. The result is inexact even though the operands are exact.

TABLE 4

Division examples according to the method of FIG. 9

| | | |
|---|---|---|
| Inputs | x = −6250000 × $10^{-5}$ | x = −9817652.H × $10^{-2}$ |
| | y = −9877000 × $10^{-4}$ | y = +0015678.L × $10^{-5}$ |
| Step 1 | Sx = 1, Sy = 1 (negative) | Sx = 1, Sy = 0 |
| | Ex = −5+Bias, Ey = −4 + Bias | Ex = −2 + Bias, Ey = −3 + Bias |
| | Cx = 6250000, Fx = 0 | Cx = 9817652, Fx = H |
| | Cy = 9877000, Fy = 0 | Cy = 0145678, Fy = L |
| Step 2 | Cu = {6250000, 0, 00000000} | Cu = {9817652, 7, 00000000} |
| | Cv = {9877000, 0} | Cv = {0015678, 2} |
| | LZx = 0; LZy = 0; m = 0 | LZx = 0; LZy = 2; m = 2 |
| Step 3 | Sr = 0 (Positive) | Sr = 1 (Negative) |
| | Eq = −9 + Bias | Eq = −5 + Bias |
| Step 4 | Cq = 00000000 63,278,323 | Cq = 00000 62,619,769,488 |
| | Rm = 1 | Rm = 1 |
| Step 5 | LZq = 8; SA = 1 | LZq = 5; SA = 6 |
| | Er = −8 + Bias | Er = 1 + Bias |
| | {Cr, Fr, Inx} = {6327832, 3, 1} | {Cr, Fr, Inx} = {0062619, 7, 1} |
| Step 6 | No exceptional input or output | No exceptional input or output |
| Step 7 | z = +6327832.L × $10^{-8}$ | z = −0062619.H × $10^{+1}$ |

The second example is the division of two inexact decimal numbers x and y. The number of leading zero digits in the coefficients of x and y is LZx=0 and LZy=2, respectively, with a maximum m=2. The injected high and low fraction digits are 7 and 2, respectively. The computed quotient Cq has five leading decimal zeros (LZq=5). The shift amount becomes SA=6 to keep only five significant digits in the result coefficient Cr. This indicates that the result coefficient cannot have more significant digits than its weakest input operand with the least number of significant digits. The result exponent Er is incremented in accordance to the shift amount SA.

Figure 10:
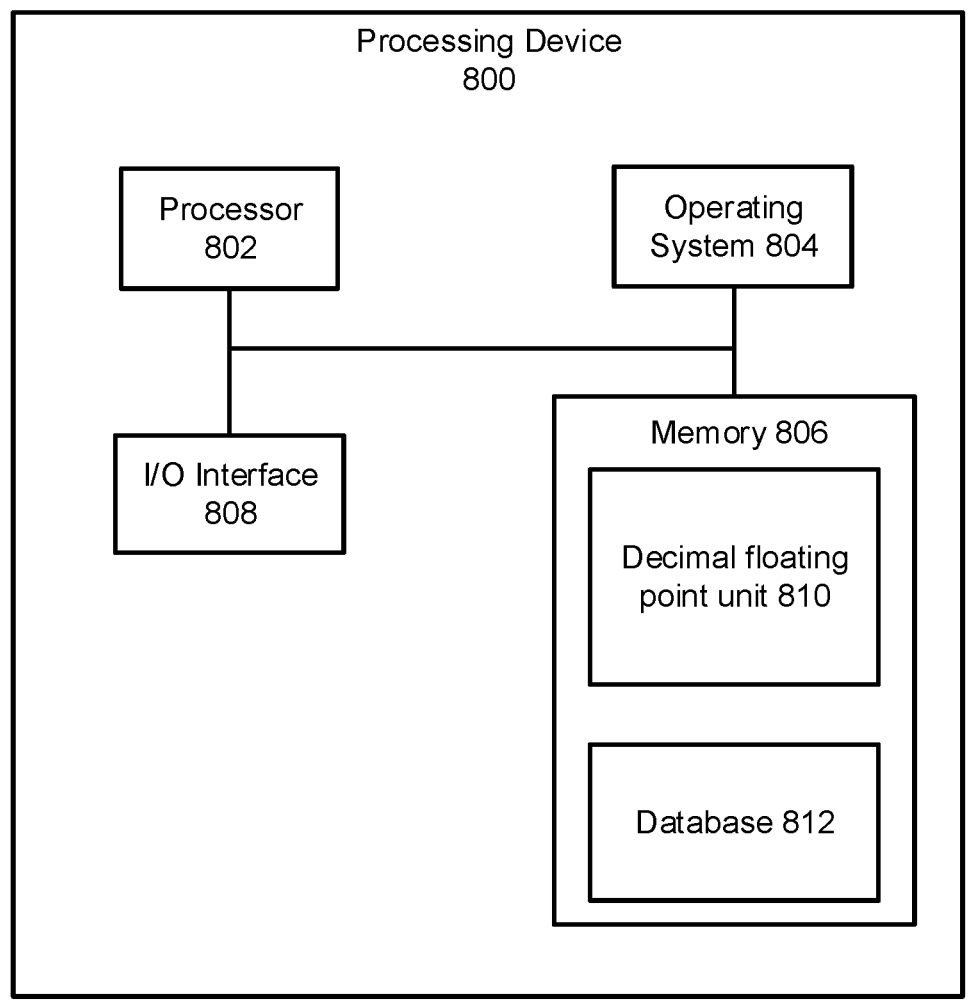
FIG. 10 illustrates the computer system which may execute the method of the disclosure.

FIG. 10 is a block diagram of an example processing device 800 which may be used to implement one or more features described herein. In one example, device 800 may be used to implement a computer device or system for performing decimal floating-point computations as described herein and perform the appropriate method implementations described herein.

Device 800 can be any suitable computer system, server, or other electronic or hardware device. For example, the device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, an operating system 804, a memory 806, and input/output (I/O) interface 808.

Processor 802 can be one or more processors and/or processing circuits to execute program code and control basic operations of the device 800. The processor 802 can include a decimal floating-point computation unit as described herein. A "processor" includes any suitable hardware and/or software system, mechanism or component that processes data, signals or other information. A processor may include a system with a general-purpose central processing unit (CPU), multiple processing units (e.g., a decimal floating-point unit), dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 806 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 806 can store software operating on the device 800 by the processor 802, including an operating system 804, one or more applications 810, and a database 812. In some implementations, applications 810 can include instructions that enable processor 802 to perform the functions described herein (e.g., in FIGS. 3-7).

For example, the application 810 can include, perform, and/or control decimal floating-point computations as described herein. Any of software in memory 804 can alternatively be stored on any other suitable storage location or computer-readable medium. In addition, memory 804 (and/or other connected storage device(s)) can store machine learning model (e.g., SVM) information, and/or other instructions and data used in the features described herein. Memory 804 and any other type of storage (magnetic disk, optical disk, magnetic tape, or other tangible media) can be considered "storage" or "storage devices."

I/O interface 808 can provide functions to enable interfacing the processing device 800 with other systems and devices. For example, network communication devices, storage devices (e.g., memory and/or database), and input/output devices can communicate via interface 808. In some implementations, the I/O interface 808 can connect to interface devices including input devices (keyboard, pointing device, touchscreen, microphone, camera, scanner, etc.) and/or output devices (display device, speaker devices, printer, motor, etc.).

For ease of illustration, FIG. 10 shows one block for each of processor 802, memory 806, I/O interface 808, and software block 810. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein.

In general, a computer that performs the processes described herein can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The invention claimed is:

1. A computerized method for performing computations, the method comprising:
   receiving, at one or more processors, a first operand in a data format, wherein the first operand is a first decimal number;
   receiving, at the one or more processors, a second operand in the data format, wherein the second operand is a second decimal number, wherein the second operand includes four fields: a sign bit, a 5-bit leading digit field, a biased exponent field, and a trailing coefficient field, wherein the leading digit field specifies whether the second decimal number is exact, an inexact decimal number with a trailing low fraction, or an inexact decimal number with a trailing high fraction; and
   performing, at the one or more processors, a computation operation comprising digit injection, in which a result of the computation operation encodes a leading digit field according to the coefficient field, exactness of a fraction field, and whether the result is overflow or not a number, wherein the trailing low fraction or the trailing high fraction of the result are replaced by decimal values, respectively, with an injected Binary-Coded Decimal fraction digit.

2. The method of claim 1, wherein the inexact result is an underflow and has a representation as an inexact zero with a minimum exponent.

3. The method of claim 1, wherein the inexact result is an overflow and is encoded in the data field as a signed value, wherein the signed value is defined outside a range of numbers representable by the data format.

4. The method of claim 1, wherein, when the computation operation includes division of a non-zero value by an exact zero, a result of infinity is produced.

5. The method of claim 1, wherein the data field of the result is encoded as NaN if the computation operation is an invalid operation.

6. The method of claim 1, wherein the normalizing is performed by a floating-point decimal processing unit within the one or more processors.

7. The method of claim 1, wherein the computation operation is performed by a floating-point processing unit within the one or more processors.

8. The method of claim 1, wherein the data format includes an exact zero representation with an encoding comprising a zero significand and a zero biased exponent.

9. A system for performing computations, the system comprising:
   one or more processors and a non-transitory computer readable storage having software instructions stored thereon configured to cause the one or more processors to:
   receive a first operand in a data format, wherein the first operand is a first decimal number;
   receive a second operand in the data format, wherein the second operand is a second decimal number, wherein the second operand includes four fields: a sign bit, a 5-bit leading digit field, a biased exponent field, and a trailing coefficient field, wherein the leading digit field specifies whether the second decimal number is exact, an inexact decimal number with a trailing low fraction, or an inexact decimal number with a trailing high fraction; and
   perform a computation operation comprising digit injection, in which a result of the computation operation encodes a leading digit field according to the coefficient field, exactness of a fraction field, and whether the result is overflow or not a number, wherein the trailing low fraction or the trailing high fraction of the result are replaced by decimal values, respectively, with an injected Binary-Coded Decimal fraction digit.

10. The system of claim 9, wherein the inexact result is an underflow and has a representation as an inexact zero with a minimum exponent.

11. The system of claim 9, wherein the inexact result is an overflow and is encoded in the data field as a signed value, wherein the signed value is defined outside a range of numbers representable by the data format.

12. The system of claim 9, wherein, when the computation operation includes division of a non-zero value by an exact zero, a result of infinity is produced.

13. The system of claim 9, wherein the data field of the result is encoded as NaN if the computation operation is an invalid operation.

14. The system of claim 9, wherein the normalizing is performed by a floating-point decimal processing unit within the one or more processors.

15. The system of claim 9, wherein the computation operation is performed by a floating-point processing unit within the one or more processors.

16. The system of claim 9, wherein the data format includes an exact zero representation with an encoding comprising a zero significand and a zero biased exponent.

17. A non-transitory computer readable medium having instructions stored therein that, when executed by one or more processors, cause the one or more processors to perform a method for performing computations, the method comprising:
   receiving, at one or more processors, a first operand in a data format, wherein the first operand is a first decimal number;
   receiving, at the one or more processors, a second operand in the data format, wherein the second operand is a second decimal number, wherein the second operand includes four fields: a sign bit, a 5-bit leading digit field, a biased exponent field, and a trailing coefficient field, wherein the leading digit field specifies whether the second decimal number is exact, an inexact decimal number with a trailing low fraction, or an inexact decimal number with a trailing high fraction; and
   performing, at the one or more processors, a computation operation comprising digit injection, in which a result of the computation operation encodes a leading digit field according to the coefficient field, exactness of a fraction field, and whether the result is overflow or not a number, wherein the trailing low fraction or the trailing high fraction of the result are replaced by decimal values, respectively, with an injected Binary-Coded Decimal fraction digit.

18. The non-transitory computer readable medium of claim 17, wherein the inexact result is an underflow and has a representation as an inexact zero with a minimum exponent.

19. The non-transitory computer readable medium of claim 17, wherein the inexact result is an overflow and is encoded in the data field as a signed value, wherein the signed value is defined outside a range of numbers representable by the data format.

20. The non-transitory computer readable medium of claim 17, wherein the data format includes an exact zero representation with an encoding comprising a zero significand and a zero biased exponent.

* * * * *